US011624406B2

(12) United States Patent
Klekotka

(10) Patent No.: US 11,624,406 B2
(45) Date of Patent: Apr. 11, 2023

(54) BEARING COOLING SYSTEMS AND METHODS FOR VIBRATORY PILE DRIVERS

(71) Applicant: American Piledriving Equipment, Inc., Kent, WA (US)

(72) Inventor: Joseph M. Klekotka, Seattle, WA (US)

(73) Assignee: AMERICAN PILEDRIVING EQUIPMENT, INC., Kent, WA (US)

( * ) Notice: Subject to any disclaimer, the term of this patent is extended or adjusted under 35 U.S.C. 154(b) by 267 days.

(21) Appl. No.: 17/192,456

(22) Filed: Mar. 4, 2021

(65) Prior Publication Data
US 2021/0277953 A1    Sep. 9, 2021

Related U.S. Application Data

(60) Provisional application No. 62/986,983, filed on Mar. 9, 2020.

(51) Int. Cl.
*F16C 37/00* (2006.01)
*E02D 13/00* (2006.01)
*F16C 33/76* (2006.01)
*F16C 35/00* (2006.01)
*E02D 7/18* (2006.01)

(52) U.S. Cl.
CPC ............ *F16C 37/007* (2013.01); *E02D 13/00* (2013.01); *F16C 33/768* (2013.01); *F16C 35/00* (2013.01); *E02D 7/18* (2013.01); *E02D 2600/00* (2013.01)

(58) Field of Classification Search
CPC ........ F16C 35/00; F16C 35/02; F16C 35/067; F16C 37/00; F16C 37/007; F16C 2350/26; E02D 7/18; E02D 13/00; E02D 2600/00; B06B 1/16
See application file for complete search history.

(56) References Cited

U.S. PATENT DOCUMENTS 3,922,043 A * 11/1975 Tompkins ............... F16C 37/00
                                                        74/87
4,270,396 A *  6/1981 Fallows .................... B06B 1/16
                                                       366/128
9,227,225 B2 *  1/2016 Evarts ................. F16H 57/0415

FOREIGN PATENT DOCUMENTS

WO    WO-2007028684 A1 *  3/2007   ............. F16C 35/04

* cited by examiner

*Primary Examiner* — Phillip A Johnson
(74) *Attorney, Agent, or Firm* — Schacht Law Office, Inc.; Michael R. Schacht

(57) ABSTRACT

A bearing cooling system for a vibratory pile driving system comprising at least one housing wall defining at least one bearing opening and at least one bearing assembly supported by the at least one housing wall in the at least one bearing opening. The bearing cooling system comprises a bearing cover plate, a bearing cover seal member, and at least one bearing bolt. The bearing cover plate defines an inner surface having a bearing cover plate seal recess. The bearing cover seal member adapted to be received at least partly within the bearing cover plate seal recess. The at least one bearing bolt is configured to secure the bearing cover plate relative to the at least one housing wall to form at least one contact location at which the bearing cover plate is in contact with at least a portion of the at least one bearing assembly.

20 Claims, 8 Drawing Sheets

BEARING COOLING SYSTEMS AND METHODS FOR VIBRATORY PILE DRIVERS

RELATED APPLICATIONS

This application Ser. No. 17/192,456 claims benefit of U.S. Provisional Application Ser. No. 62/986,983 filed Mar. 9, 2020, the contents of which are incorporated herein by reference.

TECHNICAL FIELD

The present invention relates to systems and methods for driving elongate members into the earth and, more particularly, to bearing cooling systems and methods for vibratory pile driving system.

BACKGROUND

In building, road, bridge, and other construction projects, the need often exists for driving elongate members into the ground. The elongate members may be solid (e.g., wood or concrete piles), hollow (e.g., metal or plastic piles or caissons), or sheet (e.g., metal or plastic sheet piles). The term "pile" may be used herein to refer to any elongate structural member that may be driven into the earth using a driving system or method of the present invention.

Elongate members may be arranged in the earth by excavation and back-filling, may be driven into the earth using one or more driving forces, or may be arranged in the ground by a combination of excavation/backfill and driving forces. Driving forces may be created by applying to the elongate member one or more of static forces (e.g., force of gravity and/or crowding force) and dynamic forces created by impact (e.g., drop hammer), combustion (e.g., diesel hammer), and/or vibratory forces (e.g., vibratory hammer) to force the elongate member into the ground.

The present invention relates to pile driving systems and methods that employ vibratory hammers. Pile driving systems including vibratory hammers further typically comprise a clamp system and a suppressor system. The vibratory hammer creates vibratory forces, and the clamp system rigidly secures the vibratory hammer to the pile. The suppressor system connects the vibratory hammer to a support system (e.g., crane) to inhibit transmission of vibratory forces from the vibratory hammer to the support system.

Vibratory hammers typically comprise pairs of eccentric weights that are supported on a main housing and counter-rotated in synchrony such that forces along a drive axis are added and forces in non-driving directions (e.g., directions perpendicular to the drive axis) are canceled. The clamp system secures the vibratory housing to the pile such that the drive axis is substantially aligned with pile longitudinal axis. So secured, the combination of the static force of the weight of the vibratory hammer and the clamp system and the dynamic forces created by the counter-rotated eccentric weights are sufficient to drive certain types of piles into the earth in certain soil conditions. The magnitude of the vibratory forces is a function of the weight of the eccentric weights. Typically, one or more pairs of counter-rotating eccentric weights are supported on the main housing to obtain the desired vibratory forces.

The force of the eccentric weights is typically transmitted to the main housing through bearing shafts and bearing assemblies. In particular, each eccentric weight is supported on a bearing shaft, and each bearing shaft is supported between first and second walls of the main housing by first and second bearing assemblies, respectively. The bearing assemblies must not only accommodate rotation of the bearing shafts at high speeds but must also transfer to the main housing the constantly varying forces created by the rotation of the eccentric weight relative. The bearing assemblies are a common failure component of the vibratory hammer.

One common cause of failure of the bearing assemblies is the build-up of heat due to friction created during the process of transmitting revolution of the bearing shafts to the main housing. To encourage dissipation of heat, the bearing assemblies are typically filled with bearing oil. Further, the bearing oil may be actively cooled to transfer heat out of the bearing assemblies. However, active cooling of bearing oil requires relatively complex cooling systems that must be supported at least in part by the vibratory hammer. Active cooling systems for bearing oil thus introduces another point of failure because at least a portion of the cooling system is also subjected to the vibratory forces created by the vibratory hammer.

The need thus exists for improved cooling systems and methods for vibratory hammers that facilitate the transfer of heat away from the bearings of the vibratory hammers.

SUMMARY

The present invention may be embodied as a bearing cooling system for a vibratory pile driving system comprising at least one housing wall defining at least one bearing opening and at least one bearing assembly supported by the at least one housing wall in the at least one bearing opening. The bearing cooling system of the present invention comprises a bearing cover plate, a bearing seal member, and at least one bearing bolt. The bearing cover plate defines an inner surface having a bearing cover plate seal recess. The bearing cover seal member is adapted to be received at least partly within the bearing cover plate seal recess. The at least one bearing bolt is configured to secure the bearing cover plate relative to the at least one housing wall to form at least one contact location at which the bearing cover plate is in contact with at least a portion of the at least one bearing assembly.

The present invention may also be embodied as a method of cooling a vibratory pile driving system comprising at least one housing wall defining at least one bearing opening and at least one bearing assembly supported by the at least one housing wall in the at least one bearing opening comprising the following steps. A bearing cover plate is provided. The bearing cover plate defines an inner surface having a bearing cover plate seal recess. A bearing cover seal member is provided. The bearing cover seal member is adapted to be received at least partly within the bearing cover plate seal recess. At least one bearing bolt is provided. The bearing cover plate is secured relative to the at least one housing wall with the at least one bearing bolt such that the bearing cover seal member forms a sealed chamber and at least one contact location is defined at which the bearing cover plate is in contact with at least a portion of the at least one bearing assembly.

The present invention may also be embodied as a bearing cooling system for a vibratory pile driving system comprising at least one housing wall defining at least one bearing opening and at least one bearing assembly supported by the at least one housing wall in the at least one bearing opening. The bearing cooling system comprises a bearing cover plate, a bearing cover seal member, a bearing spacer plate, and at least one bearing bolt. The bearing cover plate defines at least one bearing cover plate through opening and an inner surface having a bearing cover plate seal recess. The bearing cover seal member is adapted to be received at least partly within the bearing cover plate seal recess. The bearing spacer plate is adapted to be arranged between the bearing cover plate and the at least one housing wall. The bearing spacer plate defines at least one bearing spacer plate through opening. The at least one bearing bolt extends through the at least one bearing cover plate through opening and the at least one bearing spacer plate through opening to secure the bearing cover plate relative to the at least one housing wall. when the bearing cover plate is secured relative to the at least one housing wall, the bearing cover seal member engages the bearing spacer plate to define a sealed chamber between the bearing cover plate and the at least one bearing assembly, the bearing cover plate engages the at least one housing wall at a first contact location, the bearing cover plate engages the bearing spacer plate at a second contact location, and the bearing cover plate engages first and second portions of the at least one bearing assembly to form third and fourth contact locations.

DETAILED DESCRIPTION

Figure 1:
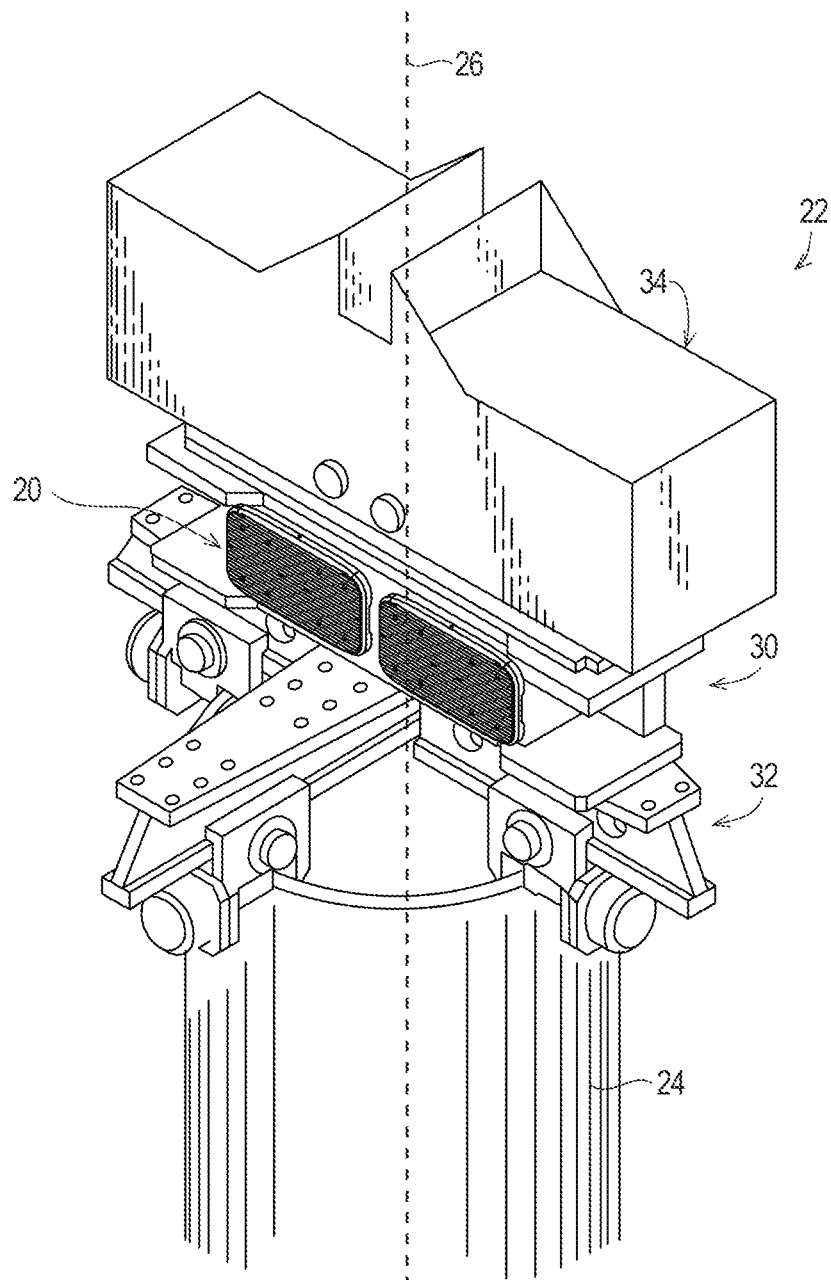
FIG. 1 is a perspective view of a first example pile driving system comprising a first example vibratory system incorporating a first example bearing cooling system of the present invention.
Figure 2:
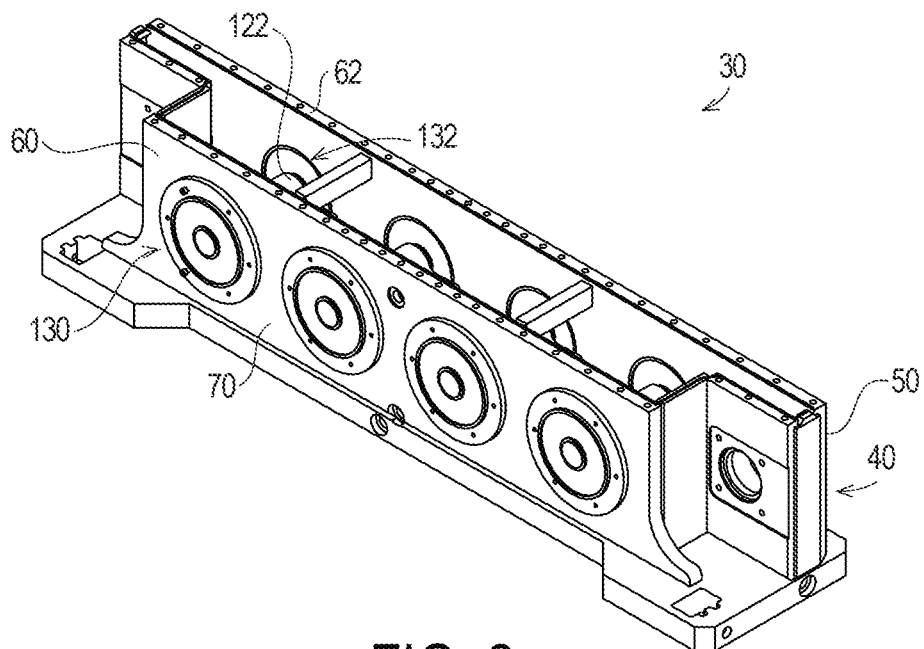
FIG. 2 is a perspective view of the first example vibratory system assembly with eccentric members not shown for clarity.
Figure 3:
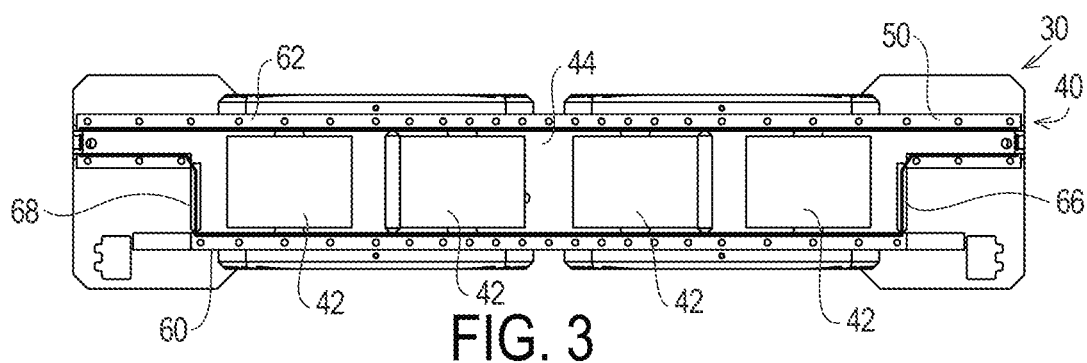
FIG. 3 is a top plan view of the first example vibratory system assembly.
Figure 4:
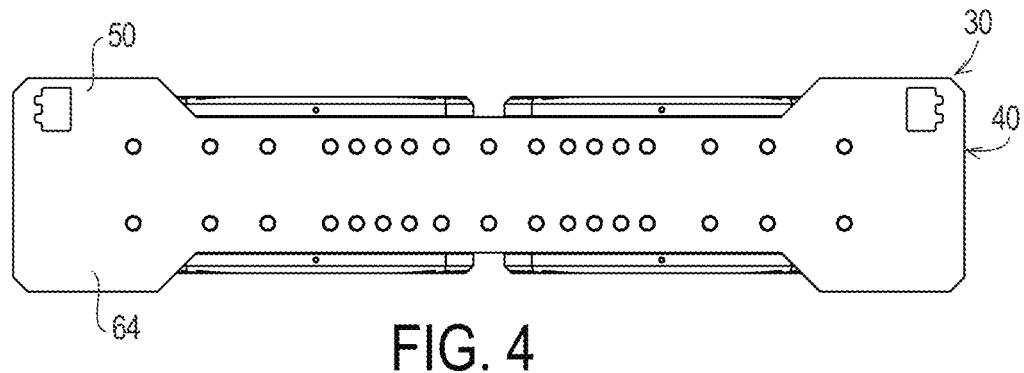
FIG. 4 is a bottom plan view of the first example vibratory system assembly.
Figure 5:
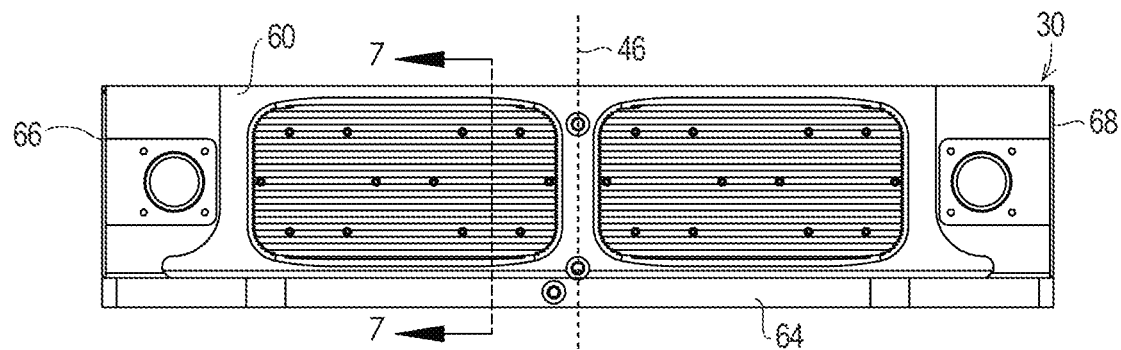
FIG. 5 is a front elevation view of the first example vibratory system assembly.
Figure 6:
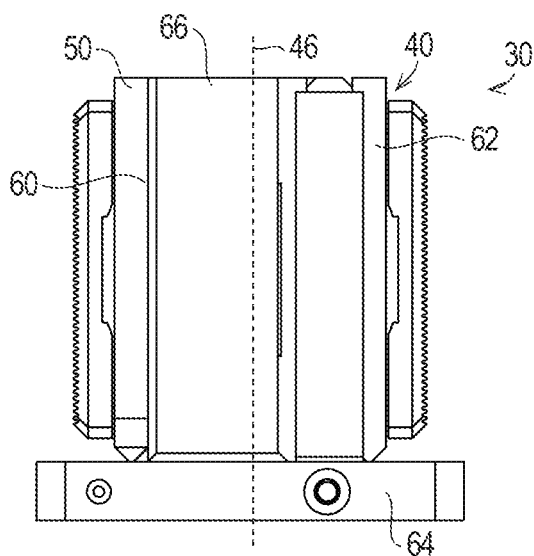
FIG. 6 is an end elevation view of the first example vibratory system assembly.

Referring initially to FIG. 1 of the drawing, depicted therein is a first example bearing cooling system 20 constructed in accordance with, and embodying, the principles of the present invention. FIG. 1 illustrates the first example bearing cooling system 20 being used as part of a first example pile driving system 22 configured to drive a pile 24 defining a pile axis 26.

The example pile driving system 22 comprises a vibratory system 30, a suppressor system 32, and a clamp system 34. The example vibratory system 30 comprises a main housing assembly 40 and a plurality of eccentric weight assemblies 42. The eccentric weight assemblies 42 are supported by the main housing assembly 40 within a housing chamber 44 defined by the main housing assembly 40 such that synchronized operation of the eccentric weight assemblies 42 causes vibratory forces to be applied to the main housing assembly 40 in two directions along a drive axis 46.

During use, the vibratory system 30 is rigidly connected to the clamp system 34, and the clamp system 34 is in turned rigidly connected to the pile 24 such that the drive axis 46 is substantially aligned with the pile axis 26. The suppressor system 32 resiliently engages the vibratory system 30 and is supported by a support system (not shown) such that the pile 24 is supported at a desired installation location (not shown) and at a desired installation orientation. The first example bearing cooling system 20 is attached to the main housing assembly 40 such that at least a portion of the first example bearing cooling system 20 is in contact with at least a portion of the eccentric weight assemblies 42. Accordingly, at least a portion of the heat generated by operation of the eccentric weight assemblies 42 is transferred to the first example bearing cooling system 20 and dissipated to the ambient air surrounding the pile driving system 22 as the pile 24 is driven into the ground (not shown).

With the foregoing general operation of the present invention in mind, the details of the first example bearing cooling system 20 will now be described in detail. The pile driving system 22 and pile 24 are or may be conventional and will be described herein only to that extent helpful to a complete understanding of the present invention.

Figure 7A:
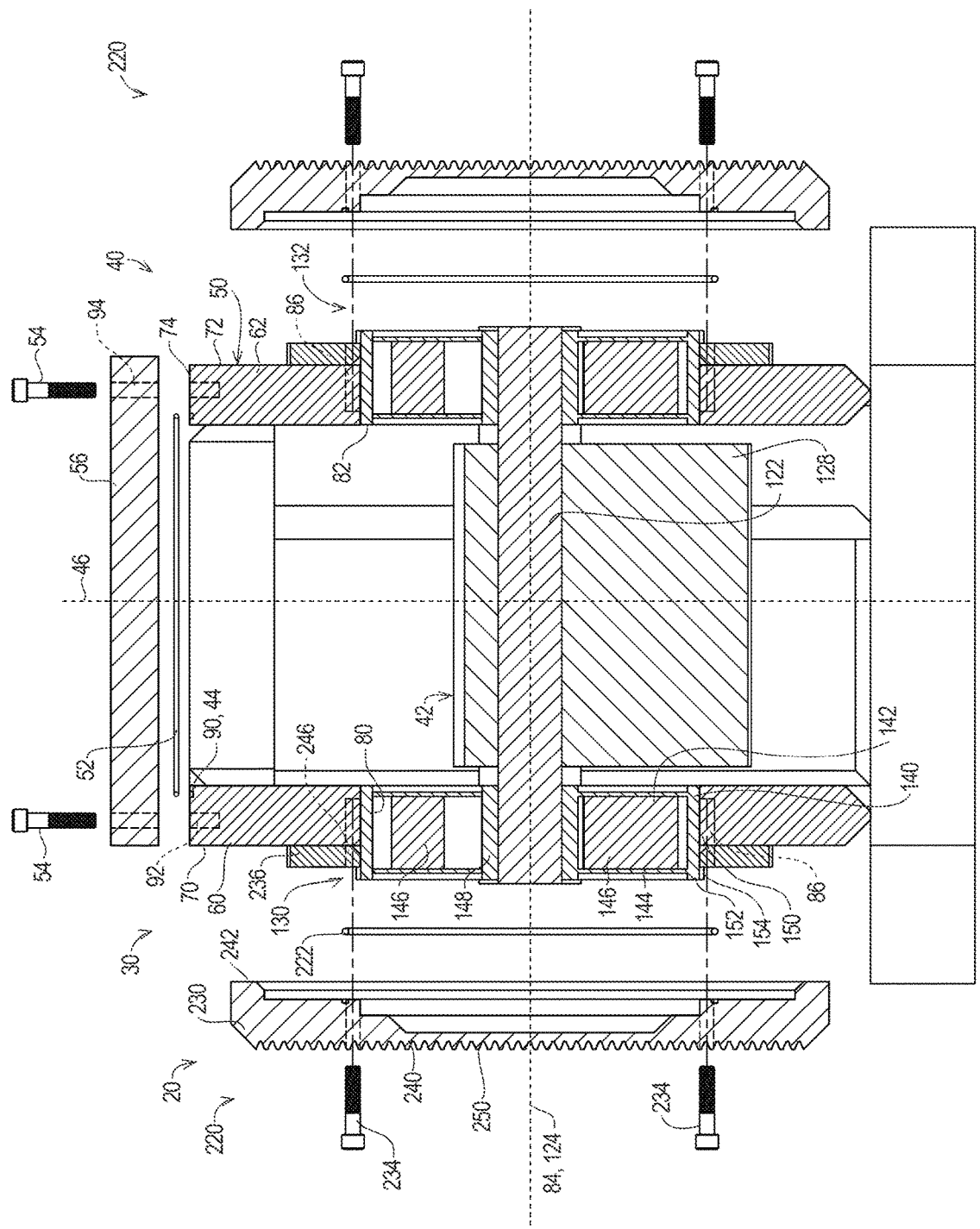
FIG. 7A is an exploded view of the first example vibratory system assembly taken along lines 7-7 in FIG. 5.
Figure 7B:
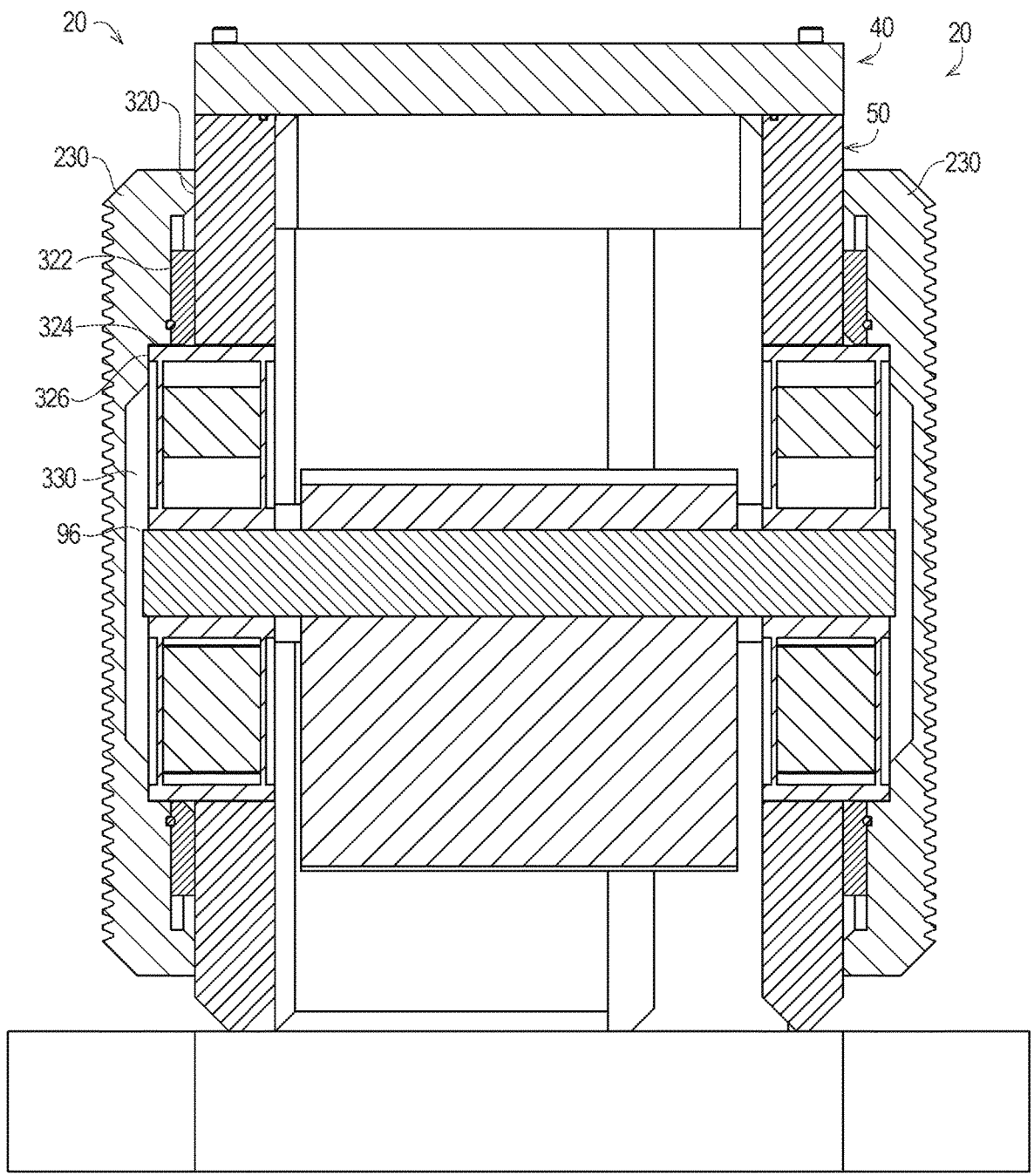
FIG. 7B is a section view of the first example vibratory system assembly taken along lines 7-7 in FIG. 5.

The example main housing assembly 40 comprises a main housing 50, a housing seal member 52 (FIGS. 7A and 7B), a plurality of housing bolts 54, and a housing cover member 56 (FIGS. 7A and 7B). The housing cover member 56 may be formed by a part of the suppressor system 32 and thus may perform two separate functions.

The example main housing 50 defines a housing first (e.g., front) wall 60, a housing second (e.g., rear) wall 62, a housing third (e.g., bottom) wall 64, a housing fourth (e.g., first end) wall 66, and a housing fifth (e.g., second end) wall 68. The housing first wall 60, housing second wall 62, housing fourth wall 66, and housing fifth wall 68 are secured by welding or the like to the housing third wall 64 to define the housing chamber 44. The housing first wall 60, housing second wall 62, housing fourth wall 66, and housing fifth wall 68 define a main housing upper perimeter edge 74.

The housing first wall 60 defines a housing first wall outer surface 70, while the housing second wall 62 defines a housing second wall outer surface 72. A plurality of first bearing openings 80 are formed in the housing first wall 60, and a plurality of second bearing openings 82 are formed in the housing second wall 62. Each of the first bearing openings 80 is associated with one of the second bearing openings 82, and each pair of associated openings 80 and 82 defines a bearing axis 84. A plurality of bearing cover bolt threaded openings 86 are formed in the housing first wall 60 and in the housing second wall 62 around each of the bearing openings 80 and 82.

A housing cover member seal recess 90 is formed in the housing upper perimeter edge 74. A plurality of bearing cover bolt threaded openings 92 are also formed in the housing upper perimeter edge 74. Housing bolt through openings 94 are formed in the housing cover member 56. With the housing seal member 52 arranged in the housing cover member seal recess 90, the housing bolts 54 are inserted through the housing bolt through openings 94 and securely threaded into the housing bolt threaded openings 92 to secure the housing cover member 56 to the main housing 50. The housing seal member 52 substantially seals any space between housing cover member 56 and the main housing upper perimeter edge 74 to define a sealed chamber 96 (FIG. 7B).

As perhaps best shown in FIGS. 7A and 7B, each of the eccentric weight assemblies 42 is supported by a pair of the associated first and second bearing openings 80 and 82. To allow counter-rotation of the eccentric weight assemblies 42, each vibratory system 30 of the present invention comprises at least two eccentric weight assemblies 42. The example pile driving system 22 comprises two pairs of eccentric weight assemblies on each side of the drive axis 46 for a total of four eccentric weight assemblies 42. However, depending on factors such as the nature of the pile and the characteristics of the earth in which the pile is to be driven, fewer or more than two pairs of eccentric weight assemblies 42 may be provided. Typically (but not necessarily), all of the example eccentric members 42 employed by a particular vibratory system are the same. The example eccentric members 42 of the example vibratory system 30 are identical and will not be described herein separately.

Each example eccentric weight assembly 42 comprises an eccentric member 120, a bearing shaft 122 defining a bearing shaft axis 124, and first and second bearing assemblies 130 and 132. Each of the first and second bearing assemblies 130 and 132 comprises a bearing housing 140, an inner race 142, an outer race 144, a plurality of bearing members 146, and a bearing hub 148. Each bearing housing 140 defines a bearing housing outer cylindrical surface 150 and bearing housing annular surface 150. An exposed portion 154 of the bearing housing outer cylindrical surface 150 and the bearing housing annular surface 150 extend out of the bearing openings 80 or 82 past the wall outer surfaces 70 and 72. The bearing hub 148 is supported on one end of the bearing shaft 122.

As is conventional, each bearing housing 140 is supported in one of the first and second bearing openings 80 and 82. The bearing members 146 each support an end of one of the bearing shafts 122 such that the each bearing shaft 122 is supported in a desired orientation relative to the bearing housings 140 (e.g., bearing shaft axis 124 aligned with bearing axis 84). The inner and outer races 142 and 144 maintain a position of the bearing members 146 within the bearing housings 140.

The first example bearing cooling system 20 will now be described in further detail with reference to FIGS. 1 and 3-7B. The first example bearing cooling system 20 comprises a plurality of bearing cover plate assemblies 220. Each bearing cover plate assembly 220 is associated with at least one of the first bearing assemblies 130 or of the second bearing assemblies 132 of the eccentric weight assemblies 42. In the example pile driving system 22, each bearing cover plate assembly 220 is associated with two bearing assemblies. In particular, given that the example vibratory system 30 comprises four eccentric weight assemblies 42 each comprising first and second bearing assemblies 130 and 132 (i.e., one on each end of the bearing shaft 122), the example vibratory system 30 comprises four of the bearing cover plate assemblies 220 as perhaps best shown in FIGS. 3 and 4. Each of the first example bearing cover plate assemblies 220 are identical and will not be described separately herein.

Figure 9:
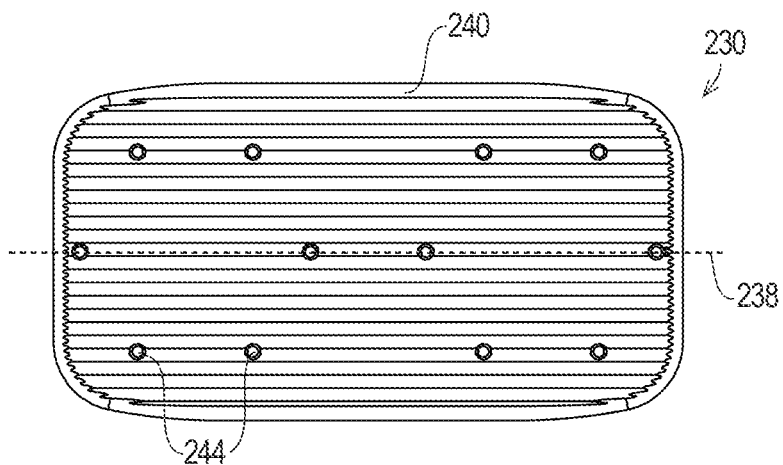
FIG. 9 is a front elevation view of the example bearing cover plate of the first example bearing cooling system.

As best shown in FIG. 7A, the example bearing plate assemblies each comprise a bearing cover plate 230, a bearing cover seal member 232, a plurality of bearing cover bolts 234, and a bearing spacer plate 236. As shown in FIG. 9, the bearing cover plate 230 defines a bearing cover plate main axis 236.

Figure 8:
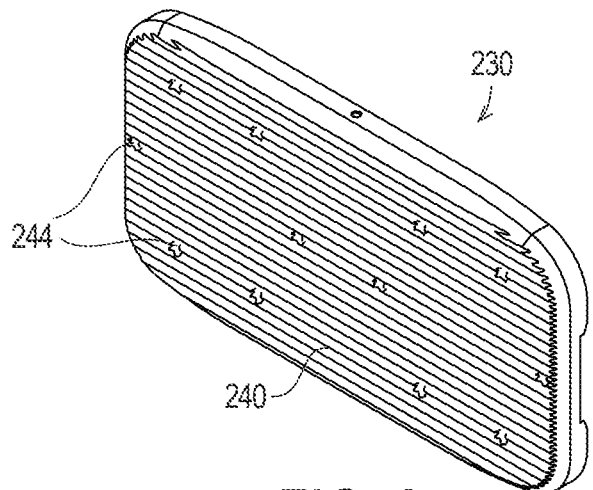
FIG. 8 is a perspective view of an example bearing cover plate of the first example bearing cooling system.
Figure 10:
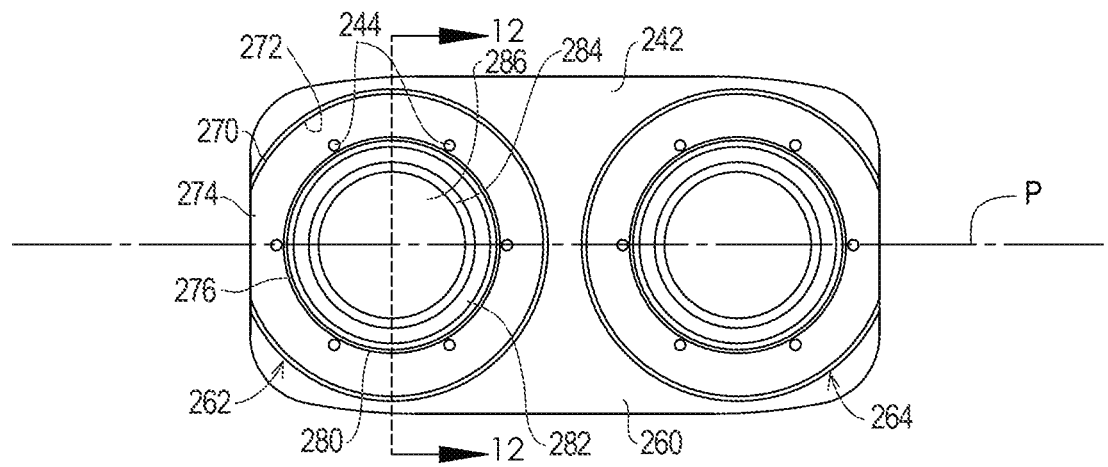
FIG. 10 is a rear elevation view of the example bearing cover plate of the first example bearing cooling system.
Figure 11:
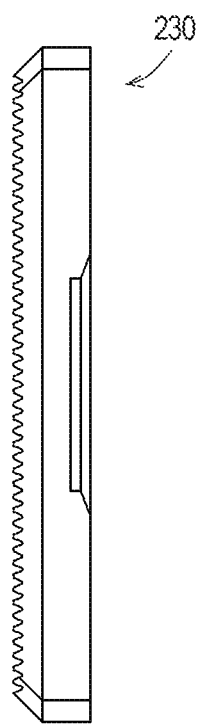
FIG. 11 is a side elevation view of the example bearing cover plate of the first example bearing cooling system.
Figure 12:
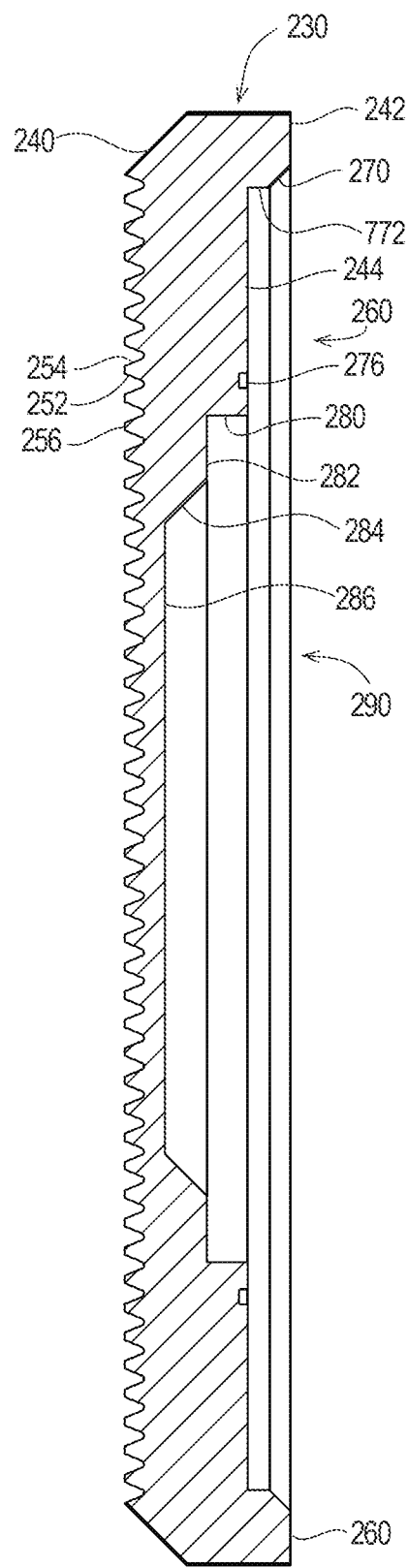
FIG. 12 is a section view taken along lines 12-12 in FIG. 10.

As perhaps best shown in FIG. 12, each bearing cover plate 230 defines an outer surface 240 and an inner surface 242. FIGS. 8-10 show that each bearing cover plate 230 defines a plurality of bearing cover bolt through openings 244. The bearing spacer plate 236 defines bearing spacer plate through openings 246. The spacer plates 148 are optional and may be arranged to fit around portions of the bearing housings 140 that extend beyond the first and second outer surfaces 70 and 72 defined by the housing first and second walls 60 and 62. The bearing housing outer surfaces 150 extend beyond the spacer plates 142 along the bearing axes 84 away from the housing chamber 44. More specifically, the bearing spacer plates 246 are arranged to be supported by the exposed portions 154 of the bearing housing outer cylindrical surfaces 150 and with the bearing spacer plate through openings 246 aligned with the bearing cover bolt threaded openings 86. The bearing spacer plates 246 may be welded to the respective housing walls 60 and 62 around the bearing openings 80 and 82.

As shown in FIG. 12, the cover plate outer surface 240 defines a plurality of fin structures 250 extending from the outer surface 240. Each fin structure 250 is defined by first connecting surface 252, a distal surface 254, and a second connecting surface 256. The example fin structures 250 are integrally formed with the bearing cover plate 230.

FIG. 12 further illustrates that the cover plate inner surface 242 comprises a main surface portion 260 and at least one bearing engagement surface portion, with the example cover plate inner surface 242 defining a first bearing engagement surface portion 262 and a second bearing engagement surface portion 264. The first bearing engagement surface portion 262 defines a first reference axis 266, while the second bearing engagement surface portion 265 defines a second reference axis 268. In particular, the example bearing cover plate 230 comprises two of bearing engagement surface portions, one for each of the pair of bearing assemblies 130 or 132 associated with the bearing cover plate 230. The main surface portion 260 is flat, and the first and second engagement bearing surface portions 262 are offset from the main surface portion 260. The example bearing engagement surface portions 262 are or may be the same and will not be discussed separately herein.

FIG. 12 illustrates that each bearing engagement surface portion 262 is defined by a first outer perimeter portion 270, a second outer perimeter portion 272, and an outer portion 274 of the cover plate inner surface 242, and a bearing cover plate seal recess 276 is formed in the outer portion 274. Further, each bearing engagement surface portion 262 is defined by an intermediate perimeter portion 280, an intermediate annular portion 282, an inner perimeter portion 284, and an inner portion 286 of the cover plate inner surface 242.

FIG. 12 illustrates that the various portions 270, 272, 274, 276, 280, 282, 284, and 286 of the inner surface 242 of the example bearing cover plate 230 defines a plate cavity 290 with reference to the main surface portion 260 of the inner surface 242. The plate cavity 290 is configured to accommodate the portion of the bearing housings 140 that extends beyond the outer surfaces 70 and 72 defined by the main housing 50. The example plate cavity 290 is further configured to accommodate the bearing spacer plate 236 as best depicted in FIG. 7B.

As shown in FIGS. 10 and 12, the bearing engagement surface portions 262 and 264 are at least partly circular and are centered about the first and second reference axes 266 and 268, respectively. The spacing between the first and second reference axes 266 and 268 is determined by the spacing between the bearing axes 84 defined by the pairs of first and second bearing openings 80 and 82 as described above. More specifically, the bearing cover plate seal recess 276 is circular, and the bearing cover bolt through openings 244 are arranged in a circular pattern with a radius slightly larger than that of the bearing cover plate seal recess 276.

To form the first example bearing cooling system 20, the eccentric weight assemblies 42 are supported by the main housing assembly 40 within the housing chamber 44. The housing cover member 56 and housing seal member 52 are then secured to the main housing 50 using the housing bolts 54. So assembled, the exposed portion 154 of the bearing housing outer cylindrical surfaces 150 and the bearing housing annular surfaces 152 are exposed.

With the bearing cover seal members 232 supported in the bearing cover plate seal recesses 276, the bearing cover plates 230 are next displaced such that the bearing cover plate through openings 244 are aligned with the bearing spacer plate through openings 246. The bearing cover bolts 234 are next inserted through the bearing plate through openings 244 and the bearing spacer plate through openings 246 and threaded into the bearing cover bolt threaded openings 86.

When the bearing spacer plates 246 are secured to the main housing assembly 40, the bearing cover plates 230 come into contact with the outer surface 70 or 72 at a first contact location 320, with the bearing spacer plate 236 at a second contact location 322, with the bearing housing outer cylindrical surface 150 at a third contact location 324, and with the bearing housing annular surface 152 at a fourth contact location 326. Heat is conducted from the bearing assemblies 130 or 132 to the bearing cover plate(s) 230 at any one or more of the contact locations 320, 322, 324, and 236. In this context, it will be understood that the term "contact" refers to conductive heat transfer by direct contact or through a lubricant or other fluid or radiant heat transfer by close proximity. Heat also will also be indirectly conducted to the bearing spacer plate 246 from the main housing 150 and the bearing assemblies 130 or 132 through the bearing spacer plate 236.

More specifically, as shown in FIG. 7B the main surface portion 260 of the bearing cover plate 230 is in contact with the main housing 40, at least a portion of the outer annular portion 274 is in contact with the spacer plate 236, the intermediate perimeter portion 280 is in contact with the exposed portion 154 of the bearing housing outer cylindrical surface 150, and the intermediate annular portion 282 is in contact with the bearing housing annular surface 152. These contact locations allow direct conduction of heat from the main housing 50 and the bearing assemblies 130 or 132 to the bearing spacer plate 246 in contact therewith. Heat transfer compound may be arranged at one or more of these contact locations to increase heat transfer to the bearing cover plate 230.

Further, heat is transferred by radiation and/or convection from the main housing 50 and the bearing assemblies 130 or 132 to the bearing cover plate 230 through a gap 330 between the moving parts of the bearing assemblies 130 or 132 and the bearing cover plate 230. In particular, the gap 330 is defined by the inner perimeter portion 284 and the inner portion 286 of the bearing cover plates 230.

Heat transferred to bearing cover plates 230 is in turn radiated away from the bearing cover plates 230. The fin structures 250 provide increased surface area to the outer surfaces 240 of the bearing cover plates 230 to enhance transfer of heat from the bearing cover plates 230. The example fin structures 250 are elongate and configured to be substantially aligned with the main axes 238 of the cover plates 230. Further, when secured to the main housing 50, the main axes 238 of the cover plates 230 are orthogonal to the drive axis 46. Vibratory movement of the main housing 50 during operation of the vibratory system 30 thus causes air to flow in a direction transverse to the elongate fin structures 250. The air flow over the elongate fin structures 250 improves transfer of heat from the bearing cover plates 230 to the air surrounding the bearing cover plates 230.

The example bearing cover plates 230 are made of metal such as aluminum having a high thermal conductivity. The thickness of the example bearing cover plates 230 is increased where thermal conduction is expected (e.g., contact locations) and decreased where radiation or convection is expected (e.g., at air gap(s)).

What is claimed is:

1. A bearing cooling system for a vibratory pile driving system comprising at least one housing wall defining at least one bearing opening and at least one bearing assembly supported by the at least one housing wall in the at least one bearing opening, the bearing cooling system comprising:
   a bearing cover plate defining an inner surface having a bearing cover plate seal recess;
   a bearing cover seal member adapted to be received at least partly within the bearing cover plate seal recess; and
   at least one bearing bolt configured to secure the bearing cover plate relative to the at least one housing wall to form at least one contact location at which the bearing cover plate is in contact with at least a portion of the at least one bearing assembly.

2. The bearing cooling system as recited in claim 1, in which the bearing cover plate defines an inner surface at least a portion of which engages the bearing assembly at the at least one contact location when the bearing cover plate is secured to the at least one housing wall.

3. The bearing cooling system as recited in claim 1, in which the at least one bearing assembly defines a bearing housing, where the at least one bearing cover plate engages the bearing housing at the at least one contact location.

4. The bearing cooling system as recited in claim 1, in which, when the bearing cover plate is secured to the at least one housing wall, the bearing cover plate seal member defines a sealed chamber between the bearing cover plate and the at least one bearing assembly.

5. The bearing cooling system as recited in claim 4, in which at least one bearing cover plate through opening is formed in the bearing cover plate, where
   the at least one cover plate through opening is outside of the sealed chamber; and
   the at least one bearing bolt extends through the bearing cover plate through opening when the bearing cover plate is secured to the at least one housing wall.

6. The bearing cooling system as recited in claim 1, further comprising a bearing spacer plate arranged between the bearing cover plate and the at least one housing wall, where the bearing cover plate and the bearing cover seal member engage the bearing spacer plate.

7. The bearing cooling system as recited in claim 1, in which the bearing cover plate further engages the at least one housing wall.

8. The bearing cooling system as recited in claim 1, in which the bearing cover plate engages a plurality of portions of the at least one bearing assembly to form a plurality of contact locations.

9. The bearing cooling system as recited in claim 1, in which the bearing cover plate further engages the at least one housing wall.

10. The bearing cooling system as recited in claim 1, further comprising a bearing spacer plate arranged between the bearing cover plate and the at least one housing wall, wherein:
the bearing cover seal member engages the bearing spacer plate;
the bearing cover plate engages the at least one housing wall at a first contact location;
the bearing cover plate engages the bearing spacer plate at a second contact location; and
the bearing cover plate engages first and second portions of the at least one bearing assembly to form third and fourth contact locations.

11. The bearing cooling system as recited in claim 1, in which the bearing cover plate defines an outer surface comprising at least one fin structure configured to dissipate heat.

12. A method of cooling a vibratory pile driving system comprising at least one housing wall defining at least one bearing opening and at least one bearing assembly supported by the at least one housing wall in the at least one bearing opening, the cooling method comprising the steps of:
providing a bearing cover plate defining an inner surface having a bearing cover plate seal recess;
providing a bearing cover seal member adapted to be received at least partly within the bearing cover plate seal recess;
providing at least one bearing bolt; and
securing the bearing cover plate relative to the at least one housing wall with the at least one bearing bolt such that the bearing cover seal member forms a sealed chamber, and
at least one contact location is defined at which the bearing cover plate is in contact with at least a portion of the at least one bearing assembly.

13. The method as recited in claim 12, in which, when the bearing cover plate is secured to the at least one housing wall, the bearing cover plate defines an inner surface at least a portion of which engages the bearing assembly at the at least one contact location.

14. The method as recited in claim 12, in which the at least one bearing assembly defines a bearing housing, where the at least one bearing cover plate engages the bearing housing at the at least one contact location.

15. The method as recited in claim 12, further comprising the steps of:
forming at least one bearing cover plate through opening in the bearing cover plate, where the at least one cover plate through opening is outside of the sealed chamber when the bearing cover plate is secured to the at least one housing wall; and
extending the at least one bearing bolt through the bearing cover plate through opening.

16. The method as recited in claim 12, further comprising the step of arranging a bearing spacer plate between the bearing cover plate and the at least one housing wall such that the bearing cover plate and the bearing cover seal member engage the bearing spacer plate.

17. The method as recited in claim 16, further comprising the steps:
engaging the bearing cover plate with the at least one housing wall at a first contact location;
engaging the bearing cover plate with the bearing spacer plate at a second contact location; and
engaging the bearing cover plate with first and second portions of the at least one bearing assembly to form third and fourth contact locations.

18. The method as recited in claim 12, further comprising the step of forming at least one fin structure configured to dissipate heat on an outer surface of the bearing cover plate.

19. A bearing cooling system for a vibratory pile driving system comprising at least one housing wall defining at least one bearing opening and at least one bearing assembly supported by the at least one housing wall in the at least one bearing opening, the bearing cooling system comprising:
a bearing cover plate defining
at least one bearing cover plate through opening, and
an inner surface having a bearing cover plate seal recess;
a bearing cover seal member adapted to be received at least partly within the bearing cover plate seal recess;
a bearing spacer plate adapted to be arranged between the bearing cover plate and the at least one housing wall, where the bearing spacer plate defines at least one bearing spacer plate through opening; and
at least one bearing bolt; wherein
the at least one bearing bolt extends through the at least one bearing cover plate through opening and the at least one bearing spacer plate through opening to secure the bearing cover plate relative to the at least one housing wall; and
when the bearing cover plate is secured relative to the at least one housing wall,
the bearing cover seal member engages the bearing spacer plate to define a sealed chamber between the bearing cover plate and the at least one bearing assembly,
the bearing cover plate engages the at least one housing wall at a first contact location,
the bearing cover plate engages the bearing spacer plate at a second contact location, and
the bearing cover plate engages first and second portions of the at least one bearing assembly to form third and fourth contact locations.

20. The bearing cooling system as recited in claim 19, in which the bearing cover plate defines an outer surface comprising at least one fin structure configured to dissipate heat.

* * * * *